Figure 4:
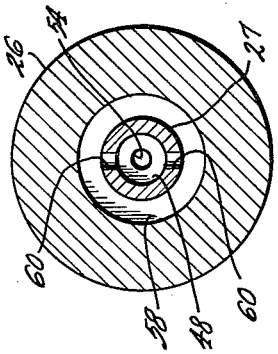
Figure 5:
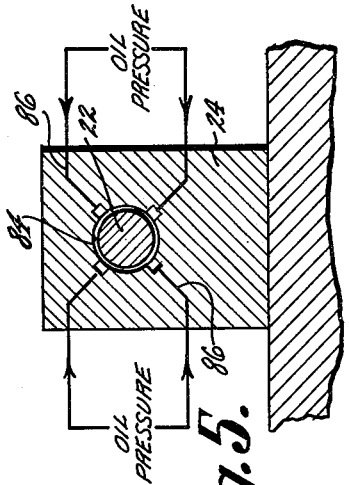

Aug. 1, 1961

W. SHULTZ 2,994,304

HYDRAULIC SERVO DRIVE SYSTEM FOR MACHINE
TOOL ELEMENTS AND THE LIKE

Filed Jan. 19, 1959

2 Sheets-Sheet 1

INVENTOR
Walter Shultz
BY
Wm O Moeser
ATTORNEY

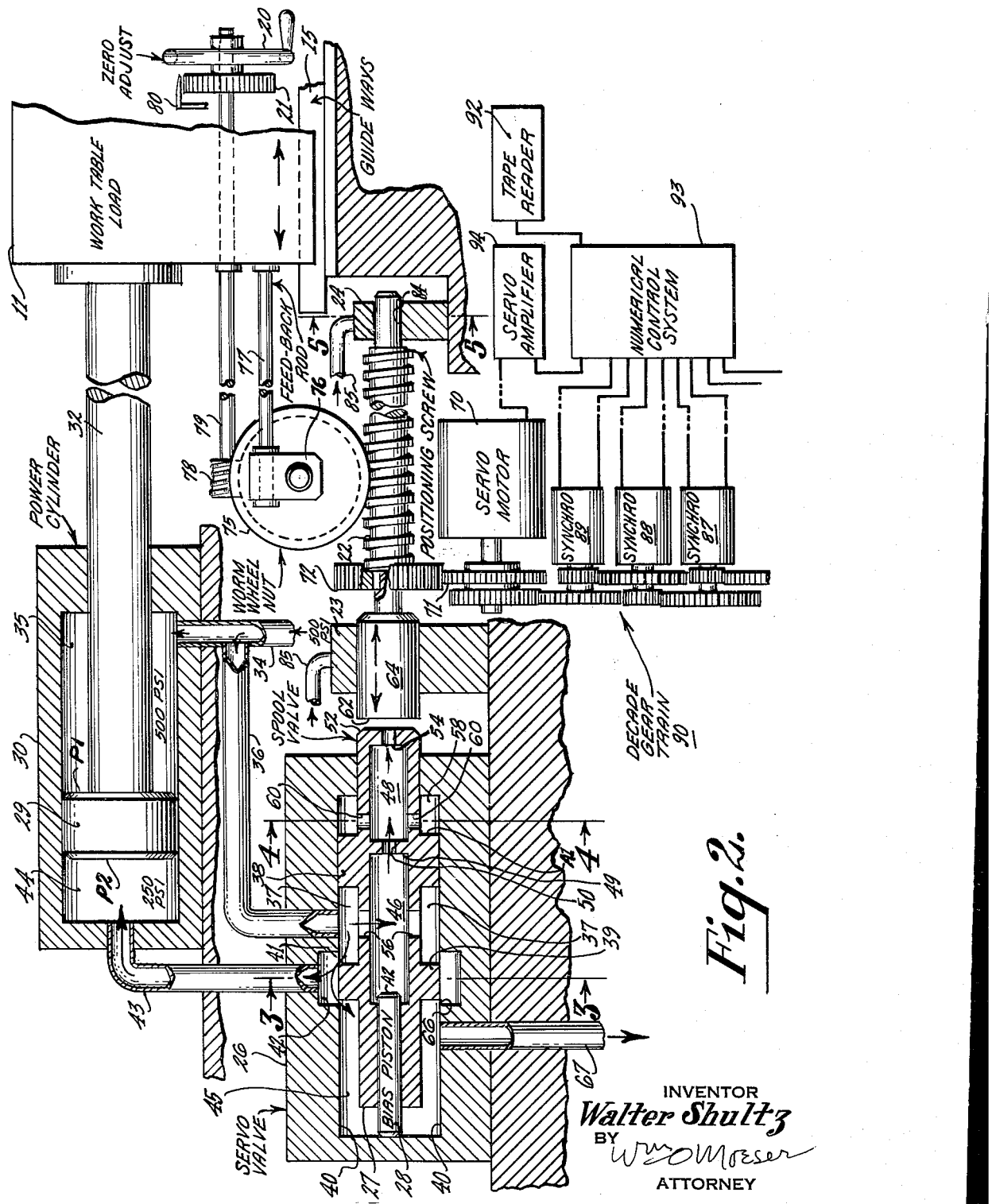

United States Patent Office 2,994,304
Patented Aug. 1, 1961

2,994,304
HYDRAULIC SERVO DRIVE SYSTEM FOR MACHINE TOOL ELEMENTS AND THE LIKE
Walter Shultz, Newport, N.H., assignor to Jones and Lamson Machine Company, a corporation of Vermont
Filed Jan. 19, 1959, Ser. No. 787,445
4 Claims. (Cl. 121—41)

The present invention relates to hydraulic servo drive systems for machine-tool and like industrial equipment having heavy work positioning parts that must be moved with precision from one point to another. More particularly, the present invention relates to a hydraulic servo drive system of the type referred to, which is adapted for use with numerically-controlled point-to-point positioning equipment for machine-tool work tables and the like.

Numerically-controlled positioning equipment for machine-tool working parts or elements is of present interest, and various methods and means have been devised for obtaining output motion of a positioning device from signals which are derived from numerical control electrical circuits. Numerical control requires that for every specific numerical input signal, there must result a predetermined motion and a corresponding specific position of a work or load element, such as the work table of a power drill or other machine tool. The problem is to convert discrete low-power lever electrical signals to high-power-level mechanical signals for moving the work or load element to corresponding discrete positions.

Positioning by numerical control imposes certain basic requirements upon the design of an output driving device which have been difficult to meet with drive systems of the hydraulic servo type. First, some means for amplifying low power level electrical signals is needed in order to provide for rapid positioning of heavy work or load elements such as machine-tool work tables, slides and carriages. Secondly, the speed of response of the drive system must be high in order to minimize positioning time. Thirdly, the output driving device must be able to position the work or load element to close dimensional tolerances.

Point-to-point controllers or positioners, as distinguished from continuous and rectilinear power controllers, control only the end points of motion. These end points may be defined numerically and are described or delineated in two dimensions. The path of movement from one point to another is not controlled, but speed of movement, along with precise positioning at each selected point, is of paramount importance. For rapid point-to-point positioning of relatively heavy drill press, punch press, and like machine-tool work tables or carriages which move on guides or ways in two different co-ordinated directions to bring the work under the operating or tool element at precise positions, a hydraulic servo drive system is desirable.

Hydraulic components for driving such controlled positioning systems have a number of advantages over electrical devices. Such components have greater power carrying capacity and are capable of producing many times larger forces than electrical devices of equivalent size and weight. Hydraulic servo systems have a high efficiency and a high static stiffness, and dynamically have extremely small time constants.

It is therefore a primary object of this invention, to provide an improved hydraulic servo drive system, which is adapted for controlled point-to-point positioning of machine tool elements having rectilinear movement along one or more predetermined axes, and which meets the basic requirements referred to, of power level amplification, high-speed response, and positioning accuracy to close dimensional tolerances.

It is a further object of this invention, to provide an improved hydraulic servo drive and position measuring system for machine tool work tables and the like, which provides multi-stage hydraulic power amplification and effective servo feedback, with manual zero adjustment.

It is also an object of this invention, to provide a hydraulic servo drive system having high power output in response to low power-level control signals, and which permits a relatively heavy work table, or like machine-tool element, to be automatically positioned by point-to-point movement with an accuracy of one thousandth inch.

A further object of this invention is to provide an improved hydraulic servo drive and position-measuring system, having hydraulic power amplification and precision position measuring and controlling ability adapted for coupling with electrical position-sensing numerical control equipment.

In accordance with the invention, a hydraulic piston in a differential power cylinder is connected to drive a machine tool work table, carriage or other relatively heavy load element which is movable along fixed ways, and is controlled by a differential hydraulic servo valve coupled with a rotary and longitudinally movable lead or positioning screw, which is a position-measuring and controlling device. Each angular position of the lead or positioning screw corresponds to some linear position of the work table and to some electrical position of a geared synchro-generator train driven with the screw by a servo motor of a point-to-point numerical control system. The screw moves longitudinally or endwise to effectively vary the size of an oil-restricting orifice in a movable chambered valve element of the servo valve which, in turn, controls the power cylinder. This endwise movement of the lead screw thus controls the power cylinder through hydraulic coupling. A feedback loop connection from the lead screw to the work table is provided by a worm-wheel nut engaging the lead screw and journalled in a rigid feedback rod connected with the work table.

Further in accordance with the invention, this system gives two stages of hydraulic power amplification under control of the hydraulic servo valve which, in turn, is controlled by a small force and a relatively small movement of the lead screw longitudinally. The system is sensitive to lead screw movements of 0.001″ and a few inch ounces of torque on the lead screw produces several thousand pounds of force on the work table to move it. The electrical control system for use with the hydraulic servo drive system converts an electrical code on a punched tape into rotational position of the lead screw which is then converted by the hydraulic servo drive system into a precise linear position of the work table or carriage. Where the work table is provided to move in two co-ordinated directions, a second set of guide ways and a sub-mount for the table is provided. Motion and control of the table in the second direction is provided by a second hydraulic servo drive system and coordinated control equipment.

The novel features that are considered to be characteristic of this invention are set forth with particularity in the appended claims. The invention, as well as additional objects and advantages pertaining thereto, will further be understood from the following description, when read in connection with the accompanying drawings, of a presently preferred embodiment for use with a machine tool of the power-punch or drill-press type having a work table or carriage on two sets of ways at right angles to each other for positioning a work piece anywhere in a limited horizontal plane for successive drilling and like operations at precise points or locations under numerical electrical control.

Figure 1:
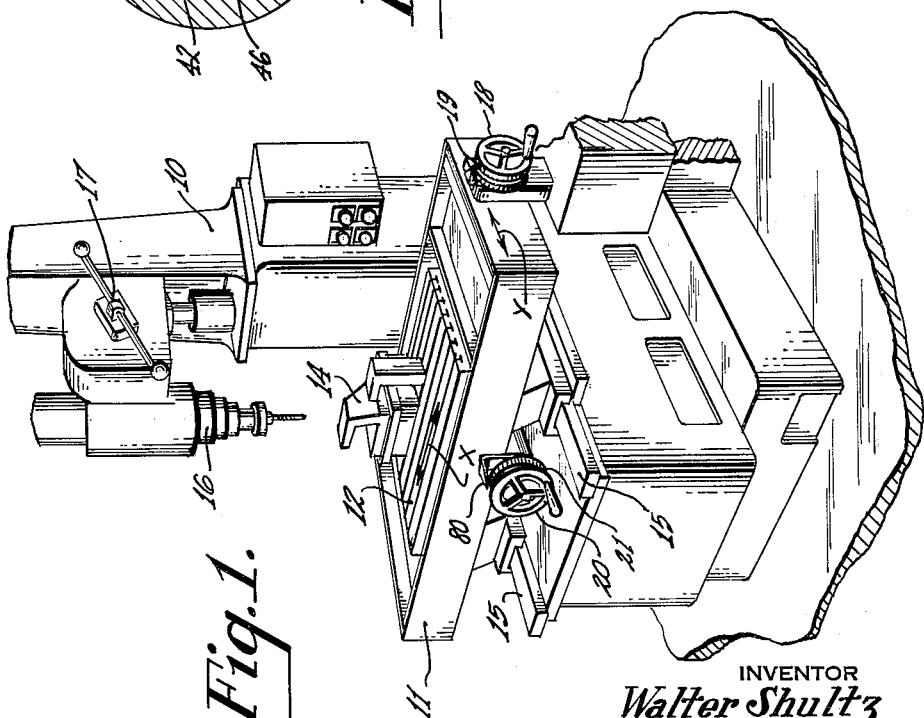

In the drawings, in which like reference numerals are applied to like elements in the several figures, FIGURE 1 is a view in perspective of the main operating portion of a machine tool of the power-drill-press type to which two hydraulic servo drive systems of the present invention are applied for controlling the work table along two co-ordinated axes in a horizontal plane;

FIGURE 2 is a schematic representation, partly in section, of a hydraulic servo drive and position measuring system, and electrical control elements connected therewith, in accordance with the invention, as applied to the machine tool of FIGURE 1, and FIGURES 3, 4 and 5 are cross-sectional views of certain portions of the system of FIGURE 2 taken on lines 3—3, 4—4 and 5—5, respectively, to further show its construction.

Referring to FIGURE 1, a power drill press 10 is provided with a lower work table 11 and an upper work table 12 carrying a work piece 14. The tables are mounted to move in a horizontal plane along axes Y and X, respectively, at right angles to each other on two sets of precision ways, one set 15 of which, for the work table 11, is shown. A power driven drill head 16 is mounted over the table and is applied to the work by operation of rotary hand lever means 17. Hydraulic power cylinders as hereinafter described, one on each axis, drive the table to any position in the horizontal plane within a prescribed rectangular area. The initial starting points and initial positioning of the table 12 along the X axis and the table 11 along the Y axis, is under control, respectively, of a handwheel 18 having a calibrated dial 19 and of a hand wheel 20 having a calibrated dial 21.

The hydraulic servo system which drives each co-ordinate axis of the drill table consists of a differential power cylinder controlled by a differential servo valve as outlined hereinbefore. The two servo drive systems are identical expect for the mass which each moves, and the stroke of the power cylinder. FIGURE 2 shows schematically the construction and features of one of these drive systems for the mass moved along the Y axis, which is the table 11 on the ways 15.

Figure 3:
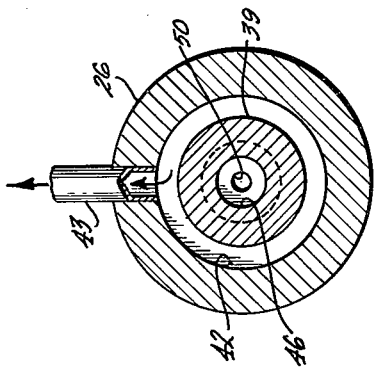

Referring now to FIGURE 2, along with sectional FIGURES 3 and 4, movement along the Y axis is performed by a servo and position-measuring system comprising a rotary lead or positioning screw 22 which is provided with limited axial or longitudinal movement and journalled in suitable fixed end bearings 23 and 24, a differential hydraulic servo valve having, within a suitable casing 26, a longitudinally movable valve spool or piston member 27 and a fixed bias piston 28 co-axially aligned along the casing axis, and a hydraulic piston 29 in a differential power cylinder 30.

The hydraulic piston 29 is rigidly connected, through a heavy piston rod 32, directly with the load or work table 11 which moves on the guide ways 15 in directions indicated by the arrowed lines. This may be considered to be along the Y axis of FIGURE 1. The differential power cylinder 30 provides an effective area on one side of the piston 29 which is one half the area on the other side of the piston. The work table 11 may be considered to represent any relatively heavy load element having resistance to movement, which it is desired to move to successive programmed points with a high degree of accuracy along the ways 15, such as to ±0.001".

The power cylinder is operated by high pressure fluid, such as oil, applied to the hydraulic system through a supply conduit 34 which is connected near one end of the cylinder directly with a high pressure chamber 35 for applying constant operating pressure to a small annular area P1 on one side of the piston 29. A branch conduit 36 connected with the supply conduit 34, conducts the high pressure oil directly into the interior of the servo valve casing and into an annular high pressure inlet chamber 37 between two longitudinally-spaced annular lands 38 and 39 of the movable valve spool or piston member 27. The lands engage the internal cylindrical wall 40 of the servo valve with a smooth sliding fit. A second annular pressure output chamber 42 provided in the valve casing, adjacent and in concentric relation to the high pressure supply chamber 37, is in variably restricted communication therewith through an annular valve means, provided by the land 39 of the valve spool 27. This valve means serves to control the flow of operating fluid or oil to and from the power cylinder 30, and the operating pressure on the large area side P2 of the piston 29, through a supply conduit 43 connected between the valve output chamber 42 and the low pressure chamber 44. Arrowed lines along the oil conducting elements serve to indicate the direction of oil flow.

For a state of equilibrium in the hydraulic system, with oil pressure from the supply conduit 34 of 500 pounds per square inch, for example, a pressure of 250 pounds per square inch is provided through the servo valve in the low pressure chamber 44 of the power cylinder. With this arrangement a constant supply pressure of 500 pounds per square inch is provided in the high pressure chamber 35 of the power cylinder and in the annular supply chamber 37 of the servo valve. This supply pressure in the chamber 37 is subjected to a pressure drop in passing through the restriction of the valve opening 41 provided between the annular land 39 and the adjacent wall of the casing 26. In a state of equilibrium in the differential servo valve, the pressure drops through this restriction to provide a pressure of 250 pounds per square inch in the valve output chamber 42 and the low pressure chamber 44 of the power cylinder.

With a supply pressure of 500 pounds per square inch in the chamber 35 and a controlled pressure of 250 pounds per square inch in the chamber 44, the piston 29 is balanced or at rest because as before noted, the piston area P1 in the chamber 35 is one half that of the area P2 in the chamber 44. Also, as before noted, the system pressure of 500 pounds per square inch is applied directly and at all times to the piston area P1 of the power cylinder. Thus as the pressure on the large area P2 in the low pressure chamber 44 rises to 251 pounds per square inch, for example, the piston 29 will move to the right and, through the piston rod connection 32, will move the work table load to the right. If the pressure in the chamber 44 drops to 249 pounds per square inch, for example, the piston 29 will move to the left and will carry the work table load to the left. The speed and force applied to the work table by the power cylinder and piston is dependent on the magnitude of the differential pressure on the piston 29 which changes as the pressure in the chamber 44 varies from 250 pounds per square inch. This, in turn, is dependent on how far the valve element or spool 27 moves to the right or left from the balanced position shown. Thus, if the valve spool 27 moves to the left, as viewed in the drawing, the valve opening 41 provided by the land 39 is increased, thereby decreasing the pressure drop and increasing the pressure in the chamber 44 above 250 pounds per square inch. The reverse is true if the valve spool moves to the right as viewed in the drawing.

The movable valve piston or spool 27, in addition to controlling the flow of operating oil to the power cylinder, also contains two axial pressure chambers 46 and 48 separated by a thin wall 49 having a small central orifice or opening 50. This provides restricted communication between the two chambers. The end 52 of the valve spool which contains the chamber 48 extends axially from the front end of the valve casing, as shown, and is provided with a second small central discharge orifice or control port 54. This provides restricted communication between the interior of the chamber 48 and the free air or exterior of the servo valve. It is also hydraulically coupled with, and controlled by, the positioning screw 22 as will hereinafter appear. The annular high-pressure supply chamber 37 within the servo valve is connected with the first inner valve chamber 46 through radial fluid conducting openings 56 so that oil, at the supply pressure of 500 pounds per square inch, is applied to the chamber 46 and flows through the restriction of the orifice 50 into the second inner chamber 48 and thence outwardly through the discharge orifice 54. A third annular chamber 58 is provided between the second land 38 of the valve spool and the adjacent end of the valve casing, and is connected with the second inner pressure chamber 48 through suitable radial supply or pressure equalizing openings 60 in the valve spool.

Due to the flow of oil through the restriction of the orifice 50 from the chamber 46 into the chamber 48, the system pressure of 500 pounds per square inch in the chamber 46, which may be termed the high pressure chamber, is dropped by the orifice 50 to a pressure of 250 pounds per square inch in the chamber 48, which may thus be termed the low pressure chamber. Through the openings 60, this pressure is applied to an annular area A1 of the land 38 in the annular chamber 58, and tends to move the valve spool 27 to the left as viewed in the drawing. This pressure is balanced by the 500 pounds per square inch in the first inner chamber 46, operating on an area A2 on the end of the bias piston 28, which is effectively one-half that of the area A1. These two areas are thus related as $2A2=A1$. Therefore, under the condition stated, the valve spool is in equilibrium and does not move.

At the discharge orifice 54 of the servo valve, an oil pad is formed between the end 52 of the valve spool and a flat face or end area 62 of the positioning screw 22 which is axially aligned with the valve spool, as shown. The flat end area 62 of the positioning screw is provided on a cylindrical anvil element 64 which is journalled in the bearing 23. By this means, a virtually frictionless hydraulic coupling is provided between the rotatable positioning screw and the valve spool which does not rotate, and this coupling permits the endwise motion of the anvil element 64 and the positioning screw as indicated by the arrowed lines, to vary the restriction of the orifice 54 and the discharge of fluid therethrough. This produces corresponding endwise or longitudinal movement or stroke of the valve spool or element 27.

As the positioning screw moves endwise from the position shown to the left upon rotation, the anvil element or end 64 of the screw closes toward the orifice 54, thereby tending to restrict the flow from the pressure chamber 48 and causing the pressure therein to rise above the equilibrium value of 250 pounds per square inch. The pressure on the valve piston or operating area A1 increases accordingly and this moves the valve spool to the left and further opens the annular land-controlled valve between the supply chamber 37 and the pressure output chamber 42, such that the pressure on the large area P2 of the piston 29 of the power cylinder is increased. This new condition creates motion of the piston 29 and the work table load to the right. Similarly, as the positioning screw 22 moves endwise from the position shown to the right upon rotation, the space between the anvil element 64 and the orifice 54 is increased, thereby lowering the pressure in the chamber 48 and on the valve piston or operating area A1 which causes the valve spool 27 to move to the right. This further closes the annular land-controlled valve between the supply chamber 37 and the pressure output chamber 42, thereby reducing the pressure in the chamber 44 of the power cylinder and the pressure on the large area P2 of the piston. Due to the unbalance in pressure, the piston and the work table load move to the left as viewed in the drawing.

The annular land 39 also provides a second annular valve opening 66 for the chamber 42 for discharging oil from the power cylinder into a collecting chamber 45 at the rear end of the valve casing and thence the oil drains to a supply tank (not shown) through an outlet conduit 67. The valve output chamber 42 and the land 39 are substantially concentric one with the other, but the land is not as wide as the chamber so that when the restriction at the supply opening 41 decreases, the relief opening 66 increases, and vice-versa. Hence, as the valve land 39 moves to the right, as viewed in the drawing, the oil leakage from the chamber 42 increases through the valve opening 66, while at the same time oil flow through the valve opening 41 to the chamber 42 is increasingly restricted. This two-way action provides rapid change in the oil pressure applied to the large area P2 of the piston 29 and quick load response to the smallest valve movement. Likewise, as the valve 39 moves to the left, as viewed in the drawing, the oil leakage from the chamber 42 decreases through the opening 66 while the applied pressure through the inlet opening 41 increases, thereby raising the pressure in the chamber 44 and on the large area P2 of the piston 29. The valve or valve land 39 thus operates to admit and remove oil from one side of the piston to vary the pressure thereon, while the opposite side receives a constant pressure from the supply line.

The positioning screw 22 is driven by an electrical servo motor 70 through a drive gear 71 mounted on and keyed to the motor shaft and a driven gear 72 mounted on and keyed to the positioning screw. The positioning screw is mounted in the bearings 23 and 24 so that the axis of the screw extends along the axis of motion of the work table or load, and, as hereinbefore noted, in axial alignment with the servo valve element 27. The screw is thus arranged to be axially parallel to the direction of motion of the load, and is so located that it may be connected thereto through motion-producing feedback connection means in a mechanical feedback loop with the power cylinder which tends to impart longitudinal or endwise motion to the positioning screw upon movement of the load. In the present example, the feedback means includes a worm-wheel nut 75 which meshes with the positioning screw as shown and is journalled to rotate about an axis at a right angle to the screw axis, in a bearing 76 carried on the end of a stiff feedback rod 77 which is rigidly connected with the work table or load. Thus the rod lies substantially axially parallel to the axis of the positioning screw. Substantially diametrically opposite to the meshing point between the worm-wheel nut and the positioning screw, a second and smaller worm gear 78 is provided in meshing engagement with the worm-wheel nut on the end of a rotary control rod 79 which is connected with the controlling handwheel 20 on the work table 11. A fixed pointer 80, not shown in FIGURE 1, is provided for the dial. The handwheel 20 and the worm gear 78 lock the worm-wheel nut 75 against rotation after adjustment by the handwheel.

From the foregoing consideration, it will be seen that rotation of the positioning screw 22 by operation of the servo motor 70 initially causes the screw to move with respect to the nut endwise or longitudinally in one direction or the other, depending on the direction of rotation. However, as hereinbefore shown, endwise movement of the positioning screw causes an unbalance in the pressure applied to the opposite sides of the power piston 29 and movement of the work table or load. Since the work table is rigidly connected through the feedback rod to the worm-wheel nut, movement of the work table carries the feedback rod and nut with it in the same direction, thereby tending to move the positioning screw longitudinally in the same direction. This is arranged to be in a direction to restore the equilibrium of the servo system. However, as long as the positioning screw continues to rotate by operation of the servo motor, the work table will continue to move in the same direction, since in this way the restoring action is not completed until the servo motor and the positioning screw come to rest. It will also be seen that rotation of the positioning handwheel 20 causes the worm-wheel nut to rotate like a gear against the positioning screw which acts like a rack in mesh with it. This action moves the screw endwise or axially and thus operates the servo system in the manner described to move the work table to any new position of adjustment. It will be noted that the gear 72 on the positioning screw is relatively wide so that as the screw moves endwise it remains in mesh with the driving gear 71 on the motor shaft.

The bearings which support the positioning screw are connected to a source of oil pressure as indicated by the conduits 85 in FIGURE 2. Referring to cross-sectional FIGURE 5 along with FIGURE 2, the bearing 24 is shown schematically on an enlarged scale to illustrate the operational features of both bearings. As indicated, bearing oil is lead through capillaries, indicated at 86, directly into the bearing clearance space 84 between the rotary and endwise movable screw 22 and the support or bearing. As indicated, four of these capillary connections are spaced equally around each bearing area. The capillaries and the bearing clearance space in each bearing form the arms of a hydraulic Wheatstone bridge, and provide large restoring forces to counteract the lateral forces imposed on the screw through the gear train and through the worm-wheel nut. Furthermore, this hydraulic bridge arrangement assures that the bearings offer only viscous friction to oppose the rotational and longitudinal motion of the positioning screw. This reduces the torque required to drive the screw to less than five inch-ounces in most cases.

Backlash between the positioning screw and the worm-wheel nut is eliminated by the jet of oil flowing from the orifice 54 at the end of the valve spool and impinging on the anvil end of the positioning screw. This tends to move the positioning screw axially or endwise to the right as viewed in the drawing, and forces one flank of the thread on the screw against the adjacent flank of the thread on the nut. This action is independent of the direction of rotation of the screw and eliminates all backlash in the positioning screw assembly.

As the positioning screw 22 turns under drive from the servo motor 70 through the gearing 71—72, a series of geared synchros or synchro generators also turn. These are geared to the positioning screw 22 and are four in number, of which three, 87, 88 and 89 are shown. The synchros are also geared or connected together in ratios of 10 to 1, through a decade gearing or gear train 90. The positioning screw may have a four-pitch thread and therefore it turns four times to produce an inch of load travel. If the load is to move, for example, 200 inches per minute, the fine synchro 89 will operate at 2000 r.p.m., the medium-fine synchro 88 at 200 r.p.m., the medium-coarse synchro 87 at 20 r.p.m. and the coarse synchro (not shown) at 2 r.p.m. Under the above conditions, the positioning screw rotates at 800 r.p.m., and therefore the gearing ratio provided between the screw and synchro system is 2½ to 1.

The electrical control system, which may now be considered briefly, converts coded information on a punched tape or the like into rotational position of the positioning screw 22, which is then converted by the hydraulic servo system into a series of definite linear positions of the work table 11. The electrical control system includes a tape reader 92 which is connected with a numerical control system 93. These and the servo motor with its power amplifier 94, which may be of the electron tube type, are not part of the present invention and need not be further described as to construction. The tape reader may give desired positions for the work table in inches to one thousandth inch, for example. The numerical control system 93 accepts signals from the tape reader and applies control voltages to the synchros to cause each of the stator fields to be in one of 10 position orientations. As in any synchro, the rotor will have a signal induced in it unless it lies in the same direction as that of the stator field. Thus there will be a signal induced in each rotor if it is not in a position called for by the signal from the tape. The synchro train thus indicates to the electrical control system, with which the hydraulic servo drive system is used, the angular position of the positioning screw and the linear position of the load with respect to a command signal.

The synchro rotors are geared to the positioning screw in 10-to-1 steps as hereinbefore noted. One revolution of the coarse synchro (not shown) corresponds to a load movement of 100 inches. Since the load travel is limited to much less than this range, this synchro never makes a full revolution. One revolution of the medium coarse synchro 87 corresponds to a load movement of 10 inches; one revolution of the medium fine synchro 88 corresponds to a load movement of 1.0", and one revolution of the fine synchro 89 corresponds to a load movement of 0.10 inch. Since each synchro rotor can be angularly positioned to one part in one hundred it becomes possible to position the load to within 0.001 inch. In operating in this manner, the control system selects the positioning screw angular-positional-error signals or rotor output voltages successively, beginning with the coarse synchro, and sends these voltages through servo amplifier 94 to the servo motor 70 which drives the positioning screw.

Since the synchro train is connected through an antibacklash gearing 90 to the positioning screw, an error signal from one of the synchros always exists to drive the servo motor until the positioning screw arrives at the angular position demanded by the input numerical command from the tape reader, which corresponds to a precise position of the load, or work table in the present example.

The closed loop operation of the hydraulic servo system is as follows: Starting with the system at rest, a rotational input signal from the servo motor 70, under control of the electrical system connected with the geared synchros which are also connected to the servo motor, causes the positioning screw initially to move horizontally in its bearings and stroke the spool 27 of the servo valve through the fluid coupling. The control port or outlet orifice 54 of the servo valve (operating from a constant pressure source) then modulates the fluid power flow to the control chamber 44 of the power cylinder 30 driving the table and producing the output motion. Feedback is through the feedback rod 77 and nut 75 to the positioning screw 22 with a directional sense which is negative with respect to the input signal. Therefore, the net longitudinal motion of the positioning screw is the positional error signal which strokes the servo valve. This positional error signal decreases to zero as the rotational input to the positioning screw ceases at the completion of a numerical command.

With regard to the positioning screw and the valve spool coupling, it will be noted that the positioning screw is a mechanical error detector. It is not a power transmitting device. It is engaged with the nut 75 on the feedback rod 77 and is free to move endwise in its bearings 23 and 24. The fluid coupling at the orifice 54 connecting the screw and valve spool provides a large actuating force to move the valve spool without actually touching it. This is accomplished, as follows:

Supply pressure acts on the end area A2 of the small bias piston 28 producing an equal, but opposite, reaction on the valve piston element or spool. Flow out of the bias piston or high pressure chamber 46 is through a fixed orifice 50, into the low pressure chamber 48 and then through the downstream or outlet orifice 54, in the end 52 of the valve spool or piston element 27, which is partially obstructed by the anvil end 64 of the positioning screw 22. The pressure in the chamber 48 is determined by the clearance between the valve element and positioning screw, and this pressure is applied to the outside area A1 of the valve element through small passages 60 and the chamber 58 where, with the system at rest, it produces a force which exactly balances the reaction from the area A2 of the bias piston 28. Any longitudinal motion of the positioning screw 22 upsets this force balance and causes the valve element 27 to follow. This arrangement of a bias piston with a fixed and variable orifice, 50 and 54 respectively, in series, constitutes a hydraulic follower with a very fast response. Through this fluid coupling with the positioning screw, the entire hydraulic system becomes sensitive to movements of the positioning screw in the order of 0.0001".

A floating reference or starting point for the work table is provided by the handwheel 20 and worm gear connection 78 with the worm-wheel nut 75. By rotating this worm-wheel nut by the handwheel 20, it will be seen that the positioning screw is displaced longitudinally, stroking the servo valve through the fluid coupling. This causes the table 11 to follow and move the nut 75 longitudinally along the screw 22 to a new position. In this way the zero location for a drilling or like programmed operation is completely flexible and can be arranged to suit the piece being machined.

From the foregoing description, it will be seen that the lead or positioning screw is a position-measuring and controlling device only. It does not drive the load element or work table. Each angular position of the lead screw corresponds to some linear position of the load element and to some electrical position of a geared synchro generator train connected and driven with the screw by a servo motor of an associated electrical numerical control system.

When the lead screw is turned, the nut on the screw being mechanically connected with the load element for feedback, must remain stationary momentarily so that the screw moves endwise slightly and varies the blocking restriction offered by one of its ends to an outlet orifice in the adjacent end of the servo valve for the power cylinder which moves the load element. This causes a differential pressure to be set up on the movable valve piston which operates the servo valve to admit or remove oil from one end of the power cylinder which is also of the differential pressure type. The piston of the power cylinder moves in a direction to restore the lead screw and valve to the neutral or pressure-balanced condition. The servo valve endwise movement controls the power cylinder and the lead screw endwise movement controls the servo valve. This gives two stages of hydraulic power amplification and greatly enhances the sensitivity and accuracy of the system. The system of the present example is sensitive to lead screw movements of 0.0001" and a few inch ounces of torque on the lead screw will produce several thousand pounds of force on the load element. There is only hydraulic coupling between the rotating lead screw and the non-rotating valve element, and hence no friction or wear on the associated parts.

The geared decade synchro generator train represents any suitable electrical angular indicator means, connected and driven with the lead screw, for reading back to an electrical control system the angular error position of the lead screw and the corresponding linear error position of the load element or work table with respect to a command electrical signal from the control system for a definite load element or work table position under the working tool of the machine tool to which the hydraulic servo drive system is applied.

The hydraulic servo drive and position-measuring system of the present invention provides a high degree of power amplification for the sensitive control and movement of relatively heavy loads, a high speed response to control signals for increased production, and a high degree of accuracy useful, for example, in the punching and drilling operations incident to the manufacture of printed circuit boards and like components of the electronics industry.

While I have shown a differential power cylinder for illustrative purposes, it will be appreciated that a balanced cylinder and a two-land servo valve could be used with equal facility. Such a valve is well known in the art, whereby pressure is distributed in varying degrees to both ends of the cylinder by the valve which may be stroked by the longitudinal movement of the positioning screw as described above, with identical results.

What is claimed is:

1. In a control system for a machine tool in which a rotatable positioning screw operates a control valve upon axial motion of said screw, a differential hydraulic servo valve having an internal movable valve element, a first fluid discharge orifice in said element adjacent one end of said screw to provide hydraulic coupling therewith in response to flow of operating fluid through said first orifice, means providing a differential low pressure chamber in said valve element in communication with said orifice and a differential high pressure chamber within said valve element, a second flow restricting orifice between said chambers and in series relationship with said first orifice, whereby longitudinal motion of said screw varies the restriction of said first orifice and the differential pressure on said valve element to effect corresponding movement thereof.

2. A coupling in a servo system comprising, a valve having a movable element, a pressure chamber in said element, a fluid discharge orifice in said chamber, pressure means providing a flow of operating fluid through said orifice, and an axially movable rotatable lead screw aligned with said valve, and having one end adjacent said orifice, whereby axially motion of said screw varies the restriction said orifice presents to the flow therethrough of operating fluid to vary the operating pressure in said chamber.

3. A coupling between a servo system control valve and an axially movable element adapted to stroke said valve comprising a pressure chamber within said valve to control said valve's position, an orifice in said chamber adjacent said element, pressure means to provide a flow of operating fluid from said chamber through said orifice and impinging on said element, whereby axial motion of said element varies the restriction afforded by said orifice, and the pressure within said chamber.

4. A coupling between a servo control valve having a axially movable spool element and a rotatable axially movable lead screw adapted to stroke said valve upon axially motion thereof comprising, a pad of hydraulic fluid under pressure between said spool element and one end of said screw.

References Cited in the file of this patent
UNITED STATES PATENTS

| | | |
|---|---|---|
| 1,959,786 | Hodgkinson | May 22, 1934 |
| 2,601,157 | Le Lan | June 17, 1952 |
| 2,690,192 | Dannhardt | Sept. 28, 1954 |
| 2,824,574 | Place | Feb. 25, 1958 |
| 2,897,788 | Rosebrook | Aug. 4, 1959 |